(12) United States Patent
Lynde

(10) Patent No.: US 8,714,273 B2
(45) Date of Patent: May 6, 2014

(54) HIGH EXPANSION METAL SEAL SYSTEM

(75) Inventor: Gerald D. Lynde, Houston, TX (US)

(73) Assignee: Baker Hughes Incorporated

( * ) Notice: Subject to any disclaimer, the term of this patent is extended or adjusted under 35 U.S.C. 154(b) by 926 days.

(21) Appl. No.: 12/470,479

(22) Filed: May 21, 2009

(65) Prior Publication Data
US 2010/0294485 A1 Nov. 25, 2010

(51) Int. Cl.
*E21B 33/12* (2006.01)
(52) U.S. Cl.
USPC ............ 166/387; 166/179; 277/605; 277/626
(58) Field of Classification Search
USPC ................. 277/605, 645, 653, 654, 626, 603; 166/387, 179, 196
See application file for complete search history.

(56) References Cited

U.S. PATENT DOCUMENTS

| | | | | |
|---|---|---|---|---|
| 2,797,759 A * | 7/1957 | Long et al. | | 277/342 |
| 3,313,553 A * | 4/1967 | Gastineau | | 277/605 |
| 3,481,611 A * | 12/1969 | Stratton | | 277/479 |
| 4,910,832 A | 3/1990 | Schaub et al. | | 24/20 |
| 5,161,806 A * | 11/1992 | Balsells | | 277/383 |
| 6,431,274 B1 | 8/2002 | Nowlin et al. | | 166/187 |
| 6,513,600 B2 * | 2/2003 | Ross | | 166/387 |
| 7,124,826 B2 * | 10/2006 | Simpson | | 166/380 |
| 7,178,601 B2 | 2/2007 | Burge | | 166/380 |
| 7,273,110 B2 * | 9/2007 | Pedersen et al. | | 166/387 |
| 7,306,034 B2 * | 12/2007 | Garcia | | 166/206 |
| 2007/0200299 A1* | 8/2007 | Kunz | | 277/511 |
| 2008/0041583 A1* | 2/2008 | Angman et al. | | 166/207 |
| 2008/0061510 A1* | 3/2008 | Li et al. | | 277/300 |
| 2009/0159265 A1 | 6/2009 | Freyer | | 166/118 |

FOREIGN PATENT DOCUMENTS

WO   WO 2006046075 A2 *   5/2006   .............. E21B 23/02

* cited by examiner

*Primary Examiner* — Shane Bomar
*Assistant Examiner* — Kipp Wallace
(74) *Attorney, Agent, or Firm* — Shawn Hunter

(57) ABSTRACT

A seal system for forming a fluid seal from an inner tubular member outwardly against an outer tubular member. The seal system includes a packer element that is radially expandable from a reduced diameter, unset condition to an enlarged diameter, set condition; and a radially expandable seal element surrounding the packer element and creating a fluid sealing engagement outwardly against the outer tubular member.

20 Claims, 7 Drawing Sheets

HIGH EXPANSION METAL SEAL SYSTEM

BACKGROUND OF THE INVENTION

1. Field of the Invention

The present invention generally relates to radial seals used in conjunction with sealing packer devices within a wellbore.

2. Description of the Related Art

Packers are known devices that are used to create fluid seals within a wellbore. One type of packer that is commonly used is an inflatable packer. An inflatable packer typically incorporates an elastomeric packer element that is expanded by inflation into sealing engagement with a surrounding casing or tubing string. The elastomeric packer element seals directly against the interior surface of the casing or tubing string.

SUMMARY OF THE INVENTION

The present invention provides a seal system which includes a radially expandable packer element and a seal element that radially surrounds the packer element to form a fluid seal outwardly against a surrounding outer tubular member. In described embodiments, the radially expandable seal element is metallic and forms a resilient and chemically-resistant seal against a surrounding tubular. In a preferred embodiment, the seal element is formed of a ductile metal. In currently preferred embodiments, the seal element is primarily formed of a copper-based alloy, such as beryllium bronze. Alternatively, the seal element is primarily formed of stainless steel. The design of the metal seal element permits a high degree of radial expansion without causing points of strain within the seal element that could cause the seal element to fail and rupture.

In preferred embodiments, the seal element is an annular seal which is shaped to have an unexpanded form which includes a plurality of expansion segments. The expandable segments each preferably include a pair of generally axially-directed legs and an elastically deformable web portion that joins the legs together. In various embodiments, the legs and web portion are generally C-shaped or U-shaped. During radial expansion of the seal element, the web portion is elastically deformed as the legs are angled apart from each other. In some embodiments, the seal element is at least partially hollow in that it defines an interior chamber. The chamber is preferably filled with a filler material, such as a fluid or an elastomer. The filler material helps to ensure a resilient seal is formed against the surrounding tubular.

In one method of operation, a wellbore tool string which carries a seal system is disposed into the flowbore of a wellbore. The packer element is radially expanded to cause the seal element to be radially expanded and caused to seal against the outer tubular wall of the flowbore. In another described method of operation, a radially expandable seal member similar to those described previously is expanded radially and then disposed into a groove within an inner mandrel. The inner mandrel is disposed within an outer mandrel to permit the seal member to form a fluid seal between the inner and outer mandrels.

BRIEF DESCRIPTION OF THE DRAWINGS

The advantages and other aspects of the invention will be readily appreciated by those of skill in the art and better understood with further reference to the accompanying drawings in which like reference characters designate like or similar elements throughout the several figures of the drawings and wherein.

DETAILED DESCRIPTION OF THE PREFERRED EMBODIMENTS

Figure 1:
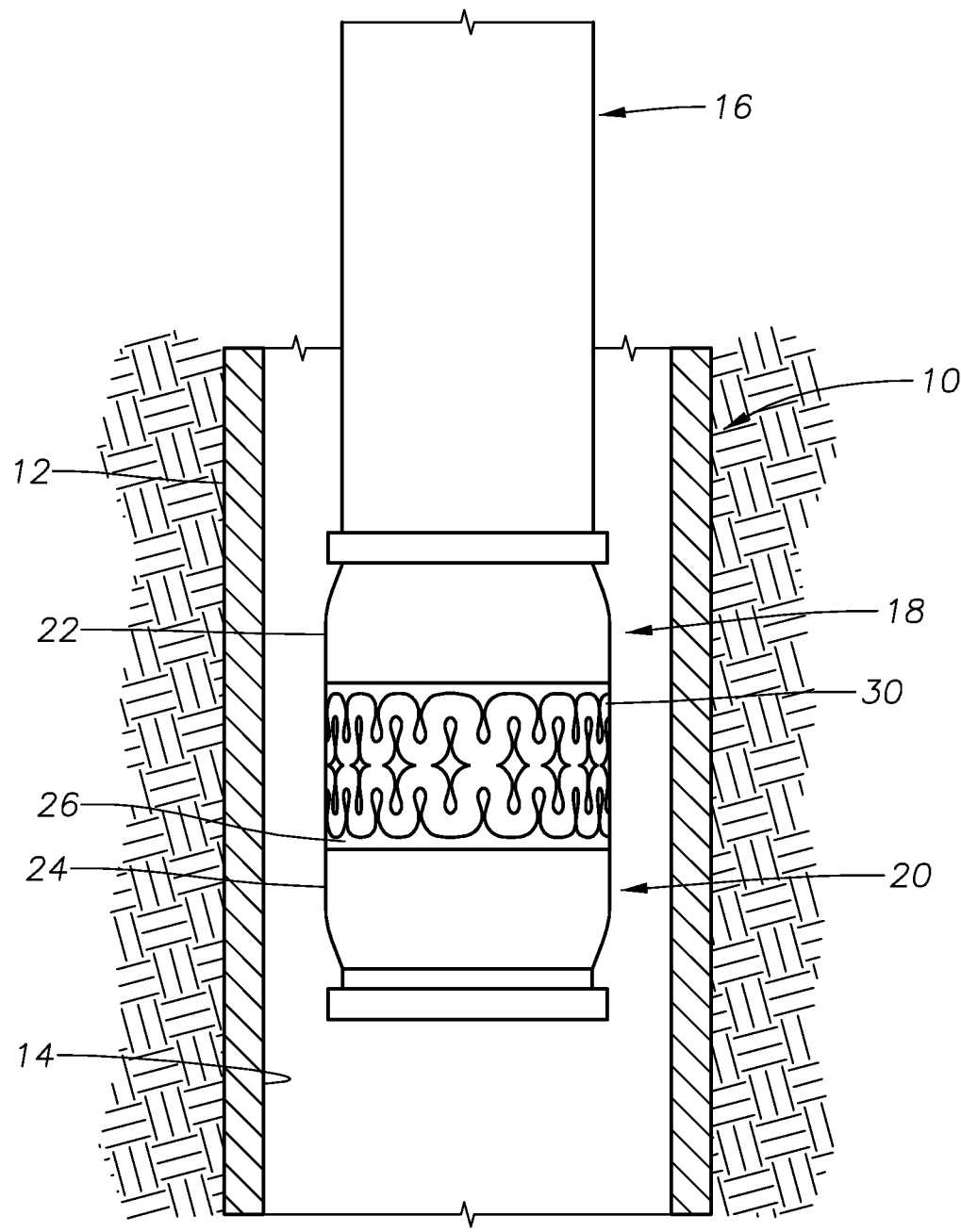
FIG. 1 is a side, partial cross-sectional view of a wellbore tool string incorporating an exemplary seal system in accordance with the present invention, in an unset, run-in configuration.
Figure 2:
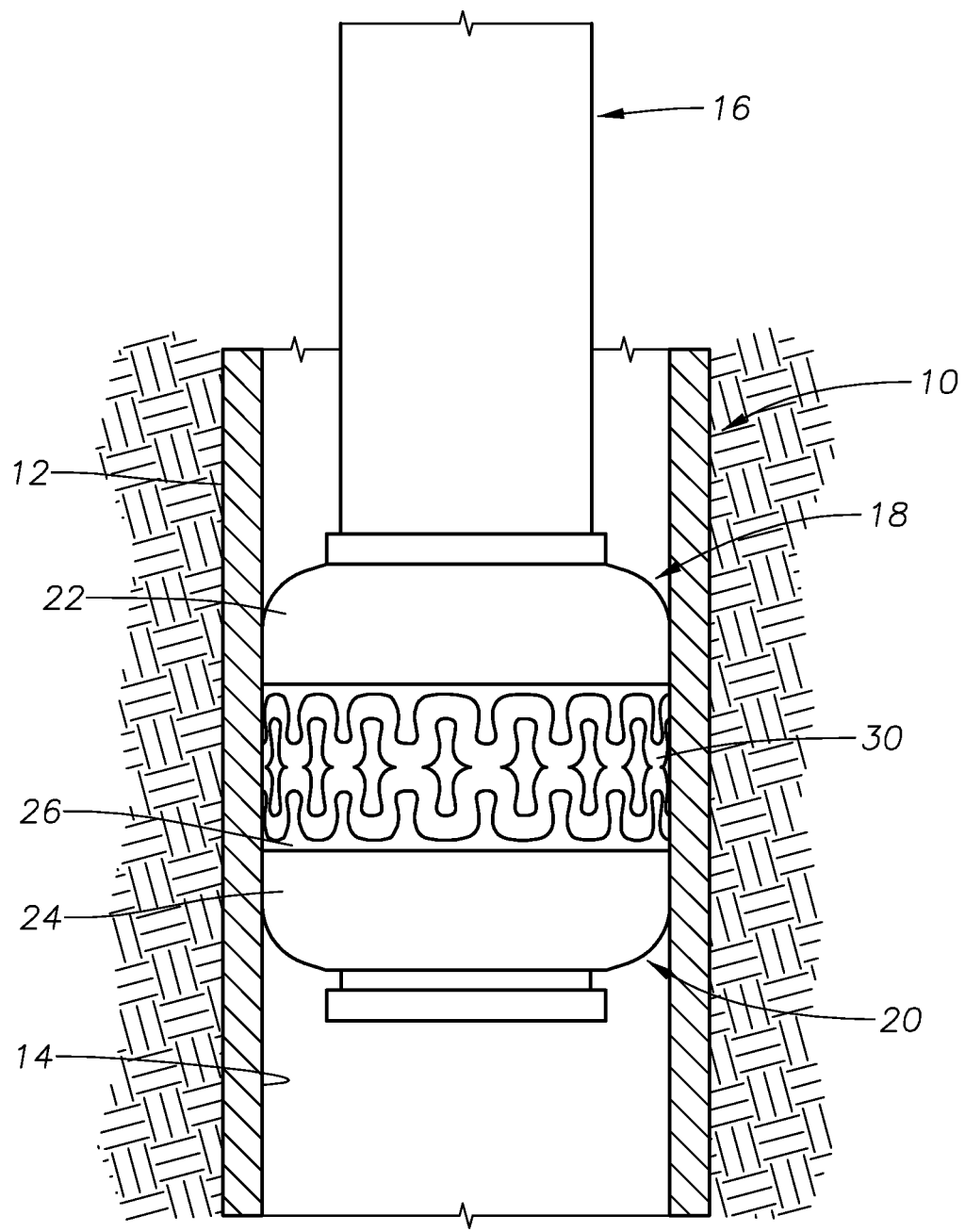
FIG. 2 is a side, partial cross-sectional view of the seal system shown in FIG. 1, now in a set position.

FIGS. 1 and 2 illustrate an exemplary wellbore 10 in which a generally cylindrical casing 12 encloses an axial flowbore 14. A wellbore tool string 16 is disposed within the flowbore 14 and extends to the surface (not shown) of the wellbore 10. The tool string 16 may be, for example, a production tubing string, of a type known in the art for flowing hydrocarbon production fluid from the wellbore 10. Those of skill in the art will understand that the tool string 16 may include valves, sliding sleeve devices, packers and other devices used in the process of flowing hydrocarbon fluids from the wellbore 10. In other instances, the tool string 16 may be a work string used to set or release tools within the wellbore 10.

Figure 3:
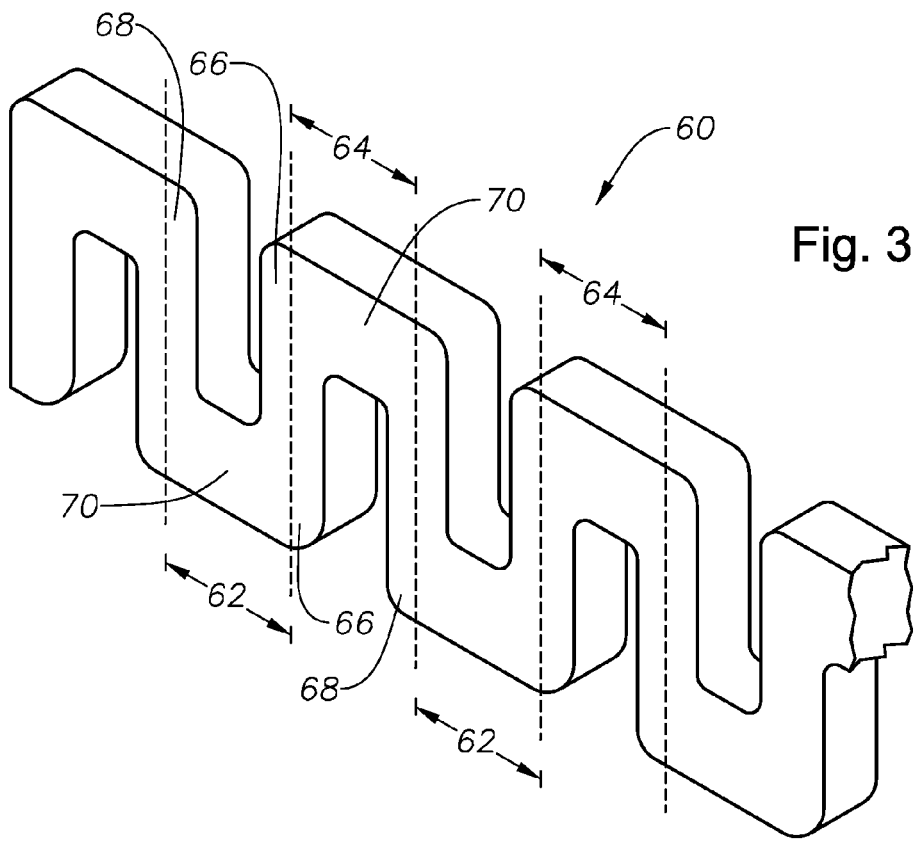
FIG. 3 is an isometric view of a seal member portion of an alternative embodiment for a seal system in accordance with the present invention, shown apart from other components of the seal system.

The wellbore tool string 16 incorporates an exemplary radially expandable packer device 18 in accordance with the present invention. In FIG. 2, the packer device 18 is in an unset position. In FIG. 3, the packer device 18 is in a set position wherein it forms a seal against the surrounding casing 12. The packer device 18 preferably includes an inflatable packer element 20 which is preferably formed of elastomeric material and which expands radially outwardly from an unset position and into a set position in response to being filled with an inflation fluid. The inflation fluid is typically flowed into the packer element 20 from the surface of the wellbore 10 through the tool string 16. Suitable inflatable packers for this application include the FLO-PAK™ inflatable packer and the XtremeZone™ 20/40 External Casing Packer, which are available commercially from Baker Hughes Incorporated of Houston, Tex. The inflatable packer element 20 is generally cylindrical in the unset position and includes a radially enlarged upper end portion 22 and a radially enlarged lower end portion 24. A central, radially-reduced reduced groove 26 is defined between the upper and lower end portions 22, 24.

An annular metallic seal element 30 radially surrounds the inflatable packer element 20 and preferably is disposed within the groove 26 of the packer element 20. The seal element 30 is preferably formed of a ductile metal such as an aluminum alloy or ³⁄₁₆" stainless steel plate metal. As shown in FIG. 1, the exemplary seal element 30 has a shape that readily permits the seal element 30 to be expanded radially without failing.

Figure 1A:
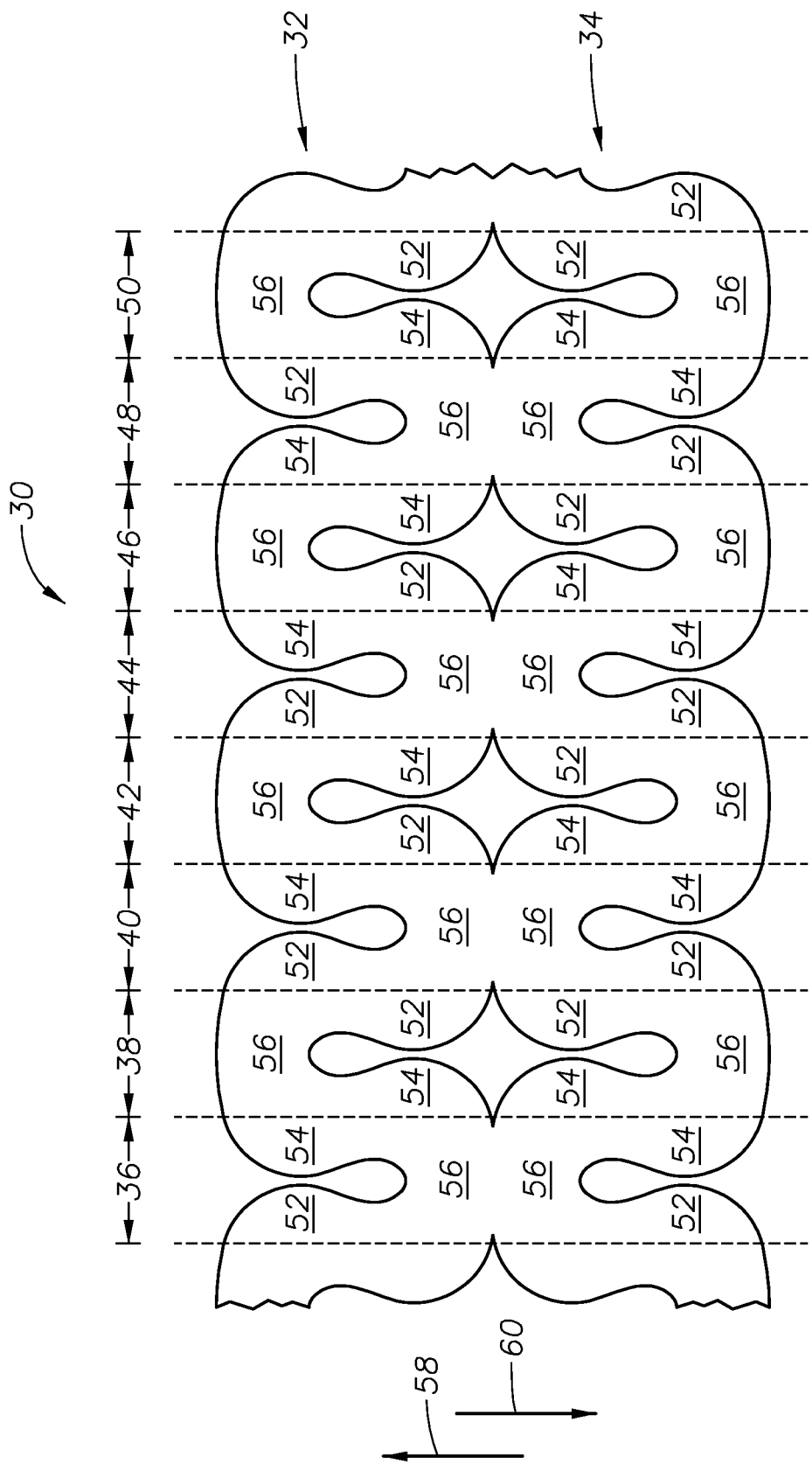
FIG. 1A is an enlarged side view of the seal element used in the seal system shown in FIG. 1.

FIG. 1A depicts a portion of the seal element 30 apart from other components of the packer device 10. The exemplary seal element 30 can be thought of as being made up of two rows 32, 34 of interconnected expansion segments. As depicted, each row 32, 34 of the seal element 30 is made up of a plurality of C-shaped expansion segments. Although the rows 32, 34 are shown to be affixed to each other, the two rows 32, 34 may, in fact, be separate from one another. In addition, there may be more or fewer that two rows. In both rows 32 and 34, the expansion segments are 36, 38, 40, 42, 44, 46, 48, and 50. The expansion segments 36, 38, 40, 42, 44, 46, 48 and 50 are substantially C-shaped and are each made up of two legs 52, 54 and a central web portion 56 that interconnects the legs 52, 54. The segments 36, 38, 40, 42, 46, 48 and 50 each expand as the legs 52, 54 of each segment are angularly separated from each other. The web portion 56 is elastically deformable during expansion of the segments. It is noted that adjacent segments preferably have oppositely directed legs 52, 54 such that the legs 52, 54 from some of the segments extend from their webs 56 in a first axial direction 58 while the legs 52, 54 of the other segments extend from their webs 56 in substantially the opposite axial direction 60.

The seal element 30 is preferably substantially formed of a ductile metal which is both resilient and which possesses significant shape memory so that the seal element 30 may be radially deformed in an elastic manner and will then substantially return to its radially unexpanded state. Because the seal element 30 is formed of metal, it provides good resistance to chemical deterioration, which might tend to harm or destroy an elastomeric seal. In currently preferred embodiments, the seal element 30 is formed of a copper-based alloy, such as beryllium bronze. In other embodiments, the seal element 30 is formed of a deformable stainless steel, such as a 316 stainless steel band.

Because the seal element 30 is capable of radial expansion and has shape memory that permits it to substantially return to its original configuration, the seal element 30 may be stretched radially to cause it to fit over the end portions 22 or 24 and be disposed into the groove 26 of the packer element 18. The points of stresses and strains associated with the radial expansion of the seal element 30 are distributed among the various expandable segments 36, 38, 40, 42, 44, 46, 48 and 50. The inventor has found that this is advantageous, as compared to a metal seal of substantially uniform and solid cross-section which, when deformed will tend to place significant strains upon inherent points of weakness in the structure and which can result in the seal failing.

In operation, the wellbore tool string 16 is disposed into the flowbore 14 of the casing 12. The packer element 20 is inflated to move it from the unset position, depicted in FIG. 1, to the set position shown in FIG. 2. As can be seen from FIG. 2, the seal element 30 is radially expanded such that the legs 52, 54 of the expansion segments are angularly spread apart from one another at the web portions 56. A high degree of radial expansion of the metallic seal element 30 is possible without causing deleterious strain upon portions of the metallic seal element 30 which could cause it to fail. In the radially expanded condition, the packer element 20 causes the seal element 30 to seal outwardly against the casing 12.

Figure 4:
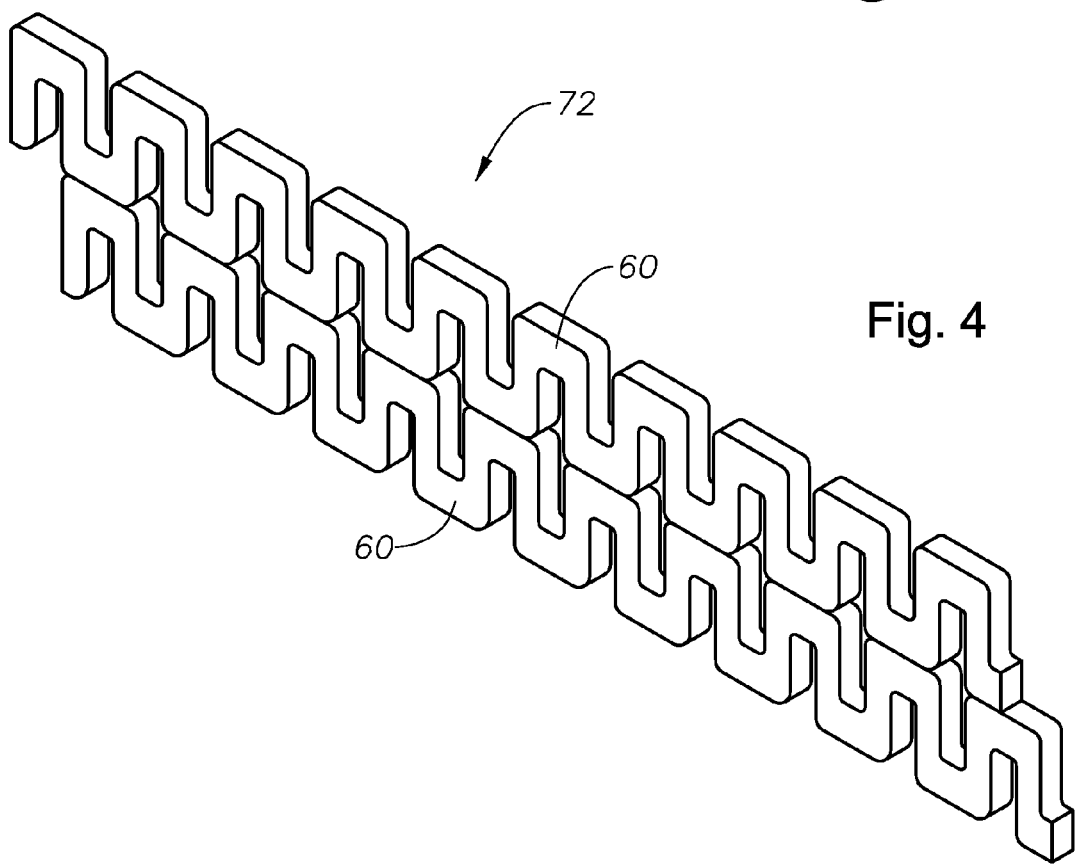
FIG. 4 is an isometric view of a pair of seal members of the type shown in FIG. 3.
Figure 5:
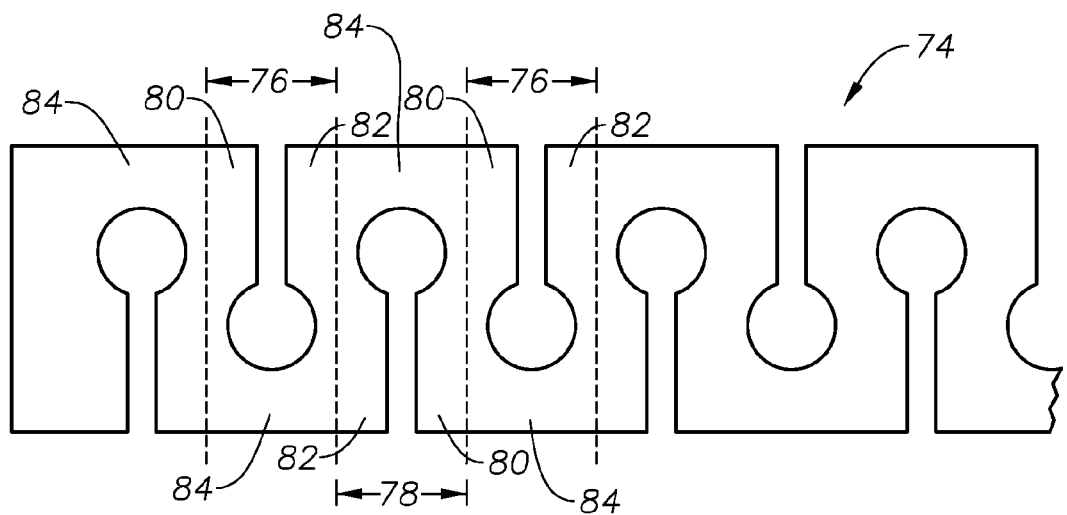
FIG. 5 is side, cross-sectional view of an alternative embodiment for a seal member.

FIGS. 3, 4 and 5 illustrate exemplary alternative embodiments for seal elements in accordance with the present invention. FIG. 3 depicts a seal element 60 in an "unrolled" fashion, although those of skill in the art will recognize that the seal element 60 actually in use circumferentially surrounds the packer element 20 in the same manner as the seal element 30 described earlier. In this embodiment, the seal element 60 is formed of a single row of interconnected expansion segments. Exemplary segments 62 and 64 are depicted. In this embodiment, the expansion segments 62 and 64 are each substantially U-shaped. The segments 62 and have legs 66, 68 which extend in a first axial direction from an expansion web portion 70. The segments 64 have legs 66, 68 which extend axially from an expansion web portion 70 in a second axial direction that is generally opposite the first direction. When expanded radially, the legs 66, 68 are angled apart from one another at the web portion 70. FIG. 4 depicts a seal element 72 which is made up of two single row seal elements 60.

FIG. 5 depicts another exemplary seal element 74, which is also shown in an "unrolled" fashion. The seal element 74 is formed of a row of interconnected expansion segments. Segments 76 and 78 are illustrated and include legs 80 and 82 which extend axially from web 84. As with the previous embodiments, the legs 80 and 82 of segments 76 extend in a first axial direction from their web portion 84 while the legs 80, 82 of the other segments 78 extend in a second axial direction that is generally opposite from the first axial direction. In the embodiment shown in FIG. 5, the expansion segments 76 and 78 are generally C-shaped.

Figure 6:
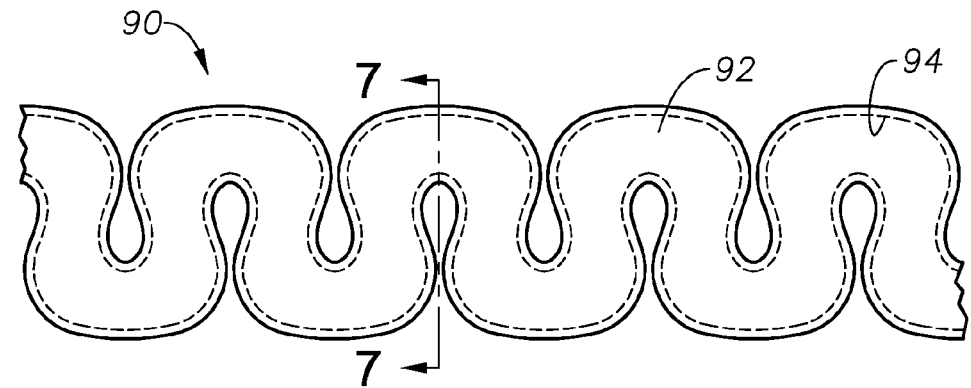
FIG. 6 is an enlarged side view of an exemplary alternative seal element in accordance with the present invention.
Figure 7:
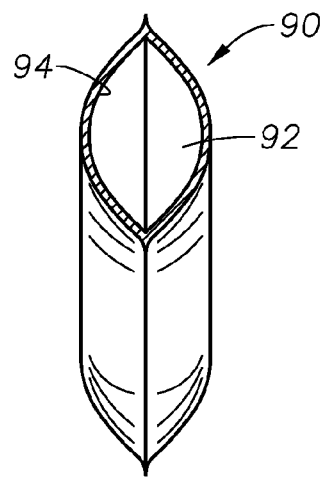
FIG. 7 is a cross-sectional view taken along the lines 7-7 in FIG. 6.

FIGS. 6 and 7 depict a further alternative seal element 90 constructed in accordance with the present invention. The seal element 90 is made up of expansion segments with legs and web portions, as described previously. However, the seal element 90 also defines an interior chamber 92 which is enclosed by an outer wall 94. The chamber 92 is filled with a filler material. In a preferred embodiment, the filler material is a fluid which will resist collapsing of the chamber 92 under high hydrostatic wellbore pressures, but will still provide some extra give when the element is compressed. In this way, the filler material of the seal element 90 will help to provide a resilient seal outwardly against the surrounding casing 12. In one embodiment, the fluid filler material comprises a gas, such as nitrogen gas. In other embodiments, the filler material comprises a liquid, such as water. In a further alternative embodiment, the chamber 92 is filled with elastomer.

It will be understood that the invention provides seal systems which can be incorporated into a radially expandable packer device to ensure that the packer device provides a metallic seal outwardly against the surrounding casing or other tubular member. Seal systems constructed in accordance with the present invention are capable of a high degree of radial expansion and are capable of substantially returning to their original, unexpanded condition due to the shape memory property of the metal used in its construction.

Figure 8:
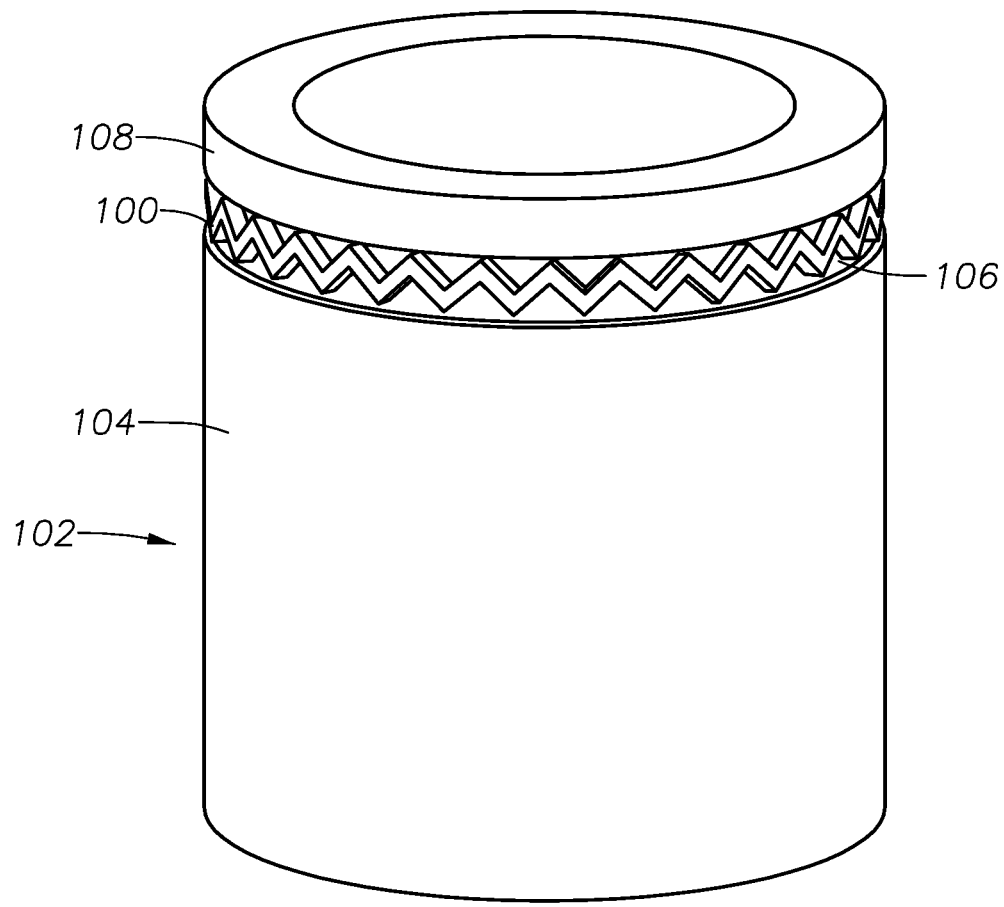
FIG. 8 is an isometric view of a mandrel having a seal element disposed in a groove thereon.
Figure 9:
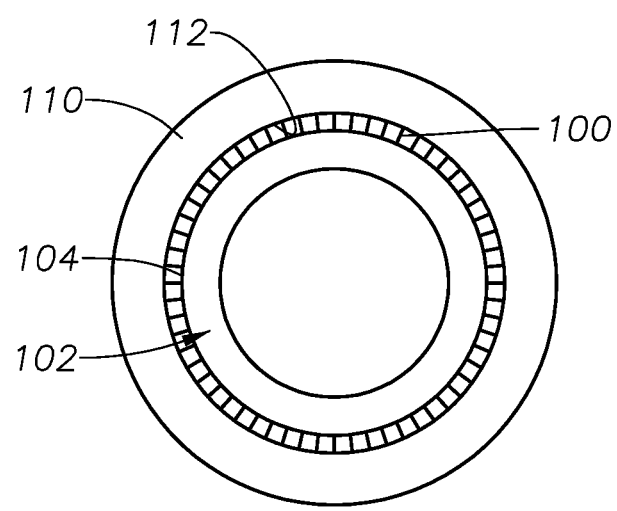
FIG. 9 is an end view showing the mandrel of FIG. 8 within an outer mandrel and the seal element forming a seal therebetween.

FIGS. 8 and 9 illustrate an alternative embodiment for the present invention wherein a metallic seal element 100 is used as a fluid seal in place of, for example, an O-ring type seal. FIG. 8 depicts an inner mandrel 102 with an outer radial surface 104 and a radially reduced groove 106 formed within. A radially enlarged shoulder 108 is adjacent the groove 106. The seal element 100 is disposed within the groove 106 and conforms inwardly against it. Because the seal element 100 is radially expandable, as discussed previously with the seal elements 30, 60, 74 and 90, the seal element 100 may be disposed into the groove 106 by radially expanding it to pass it over the shoulder 108 and into the groove 106. The shape memory of the seal element 100 will cause the seal element 100 to retract into the groove 106.

FIG. 9 is an end view depicting the inner mandrel 102 disposed within an outer mandrel 110 which presents a radially inwardly facing surface 112. The seal element 100 forms a resilient fluid seal between the inner and outer mandrels 102, 110.

Figure 10:
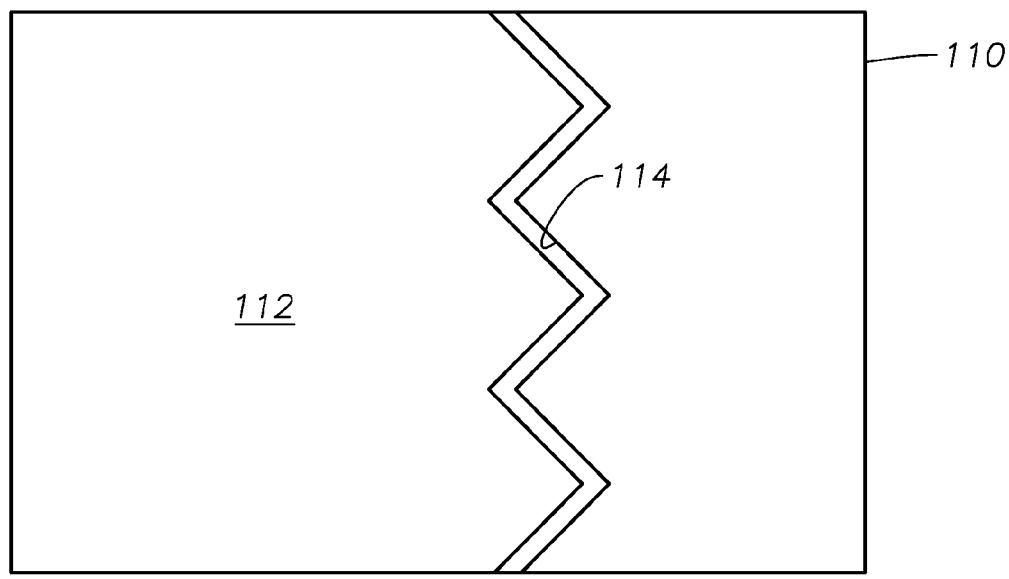
FIG. 10 is an "unrolled" view of an annular groove formed within an outer tubular member and into which a seal element can be seated.
Figure 11:
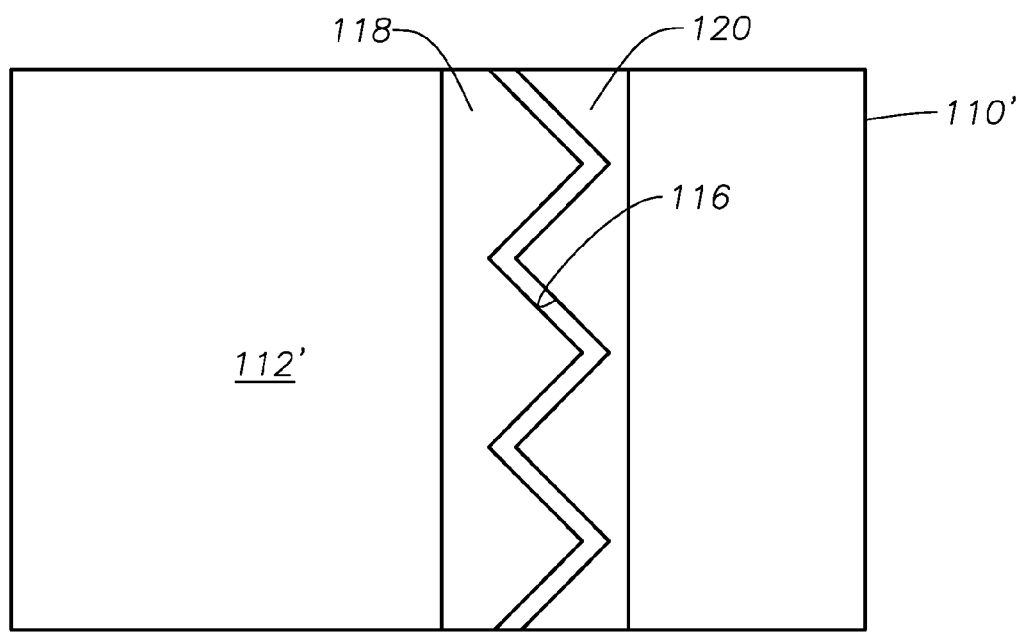
FIG. 11 is an "unrolled" view of a second annular groove formed within an outer tubular member and into which a seal element can be seated.

FIGS. 10 and 11 depict exemplary seating grooves formed within a surrounding outer tubular member and into which a radially expandable seal element, in accordance with the present invention, will be seated. In FIG. 10, depicts the interior surface 112 of the outer mandrel 110. The interior surface 112 is depicted in an "unrolled" fashion so that the interior surface 112 is essentially depicted as flat. A groove 114 is machined into the surface 112 in a corrugated shape that is complimentary to the corrugated shape of the seal element 100. When the seal element 100 seals against the interior surface 112, it will become seated within the groove 114, thereby improving the fluid sealing of the seal arrangement.

FIG. 11 depicts an alternative interior surface 112' for an alternative outer mandrel 110'. A groove 116 is formed therein, preferably by machining, and, as with the groove 114, the groove 116 has a corrugated shape that is complimentary to the corrugated shape of the seal element 100. Annular backup rings 118 and 120 are disposed on each axial side of the groove 116. The backup rings 118, 120 may be metallic or non-metallic, and are likely to be scarf cut. When the seal element 100 seals against the interior surface 112 and becomes seated within the groove 116, the backup rings 118, 120 will mate against the axial sides of the seal element 100, thereby increasing the fluid sealing of the seal arrangement.

It will also be understood that, in certain aspects, the invention provides seal systems that include a packer element that is radially expandable between a reduced diameter unset position and an enlarged diameter set position. In addition, the seal system of the present invention preferably includes a seal element having an annular configuration in order to provide a complete seal about the interior surface of a surrounding outer tubular member. An annular fluid seal is created by the seal elements 30, 60, 72 or 74 outwardly against the casing 12.

Those of skill in the art will understand that, although a wellbore casing 12 and an outer mandrel 110 is illustrated as an outer tubular member, these are merely examples. In fact, a liner, production tubing string, or other tubular member, may serve as the outer tubular member against which the seal element 30, 60, 72 or 74 is set.

Those of skill in the art will recognize that numerous modifications and changes may be made to the exemplary designs and embodiments described herein and that the invention is limited only by the claims that follow and any equivalents thereof.

What is claimed is:

1. A seal system for forming a fluid seal from an inner tubular member outwardly against an outer tubular member, the seal system comprising:
    a radially expandable seal element surrounding the inner tubular member and creating a fluid sealing engagement outwardly against the outer tubular member, the seal element comprising a row of interconnected expansion segments, each of the expansion segments deforming elastically as the seal element is radially expanded; and
    a corrugated seating groove formed within the outer tubular member that is generally complimentary in shape to the seal element and into which the seal element is seated during sealing.

2. The seal system of claim 1 wherein each expansion segment of the expansion segments of the seal element comprise:
    a web portion that is elastically deformable;
    first and second legs that extend from the web portion; and
    wherein the expansion segment expands by angling the legs apart from one another at the web portion.

3. The seal system of claim 2 wherein the expansion segment is generally C-shaped.

4. The seal system of claim 2 wherein the expansion segment is generally U-shaped.

5. The seal system of claim 1 wherein the seal element is substantially formed of metal.

6. The seal system of claim 5 wherein the metal is a copper alloy.

7. The seal system of claim 5 wherein the metal is stainless steel.

8. The seal system of claim 1 wherein the seal system further comprises a packer element that is radially expandable from a reduced diameter, unset condition to an enlarged diameter, set condition, the seal element forming a fluid seal against the outer tubular member when the packer element is in the set condition, and wherein the packer element includes:
    a radially enlarged end portion;
    a radially reduced groove; and wherein
    the seal element resides within the groove.

9. The seal system of claim 1 wherein the seating groove has axial sides and the system further comprises:
    an annular backup ring disposed on each axial side of the seating groove.

10. A seal system for forming a fluid seal from an inner tubular member outwardly against an outer tubular member, the seal system comprising:
    a metallic radially expandable seal element surrounding the inner tubular member and creating a fluid sealing engagement outwardly against the outer tubular member, the seal element comprising a row of interconnected expansion segments, each of the expansion segments deforming elastically as the seal element is radially expanded; and
    a corrugated seating groove formed within the outer tubular member that is generally complimentary in shape to the seal element and into which the seal element is seated during sealing.

11. The seal system of claim 10 wherein each expansion segment of the expansion segments of the seal element comprises:
    a web portion that is elastically deformable;
    first and second legs that extend from the web portion; and
    wherein the expansion segment expands by angling the legs apart from one another at the web portion.

12. The seal system of claim 11 wherein the expansion segment is generally C-shaped.

13. The seal system of claim 11 wherein the expansion segment is generally U-shaped.

14. The seal system of claim 10 wherein the seating groove has axial sides and the system further comprises:
    an annular backup ring disposed on each axial side of the seating groove.

15. The seal system of claim 10 wherein the seal system further comprises a packer element that is radially expandable from a reduced diameter, unset condition to an enlarged diameter, set condition, the seal element forming a fluid seal against the outer tubular member when the packer element is in the set condition, and wherein:

the packer element includes:
a radially enlarged end portion;
a radially reduced groove; and wherein
the seal element resides within the groove.

16. The seal system of claim 15 wherein the packer element comprises an inflatable packer element.

17. A method of forming a fluid seal within the flowbore of an outer tubular member having a seating groove formed therein, the method comprising:

disposing a seal system within the flowbore of the outer tubular member, the seal system having a radially expandable seal element surrounding the packer element and creating a fluid sealing engagement outwardly against the outer tubular member when the packer element is in the set condition, the seal element comprising a row of interconnected expansion segments, each of the expansion segments deforming elastically as the packer element is radially expanded; and radially expanding the seal element to its set condition to cause the seal element to form a fluid seal against the outer tubular member and become seated within the seating groove.

18. A seal system for forming a fluid seal from an inner tubular member outwardly against an outer tubular member, the seal system comprising:

a radially expandable seal element surrounding the inner tubular member and creating a fluid sealing engagement outwardly against the outer tubular member, the seal element comprising a row of interconnected expansion segments, each of the expansion segments deforming elastically as the seal element is radially expanded;

wherein the seal element defines an interior chamber; and the outer tubular member having a seating groove formed therein into which the seal element is seated when expanded.

19. The seal system of claim 18 wherein the interior chamber is filled with a fluid.

20. The seal system of claim 18 wherein the interior chamber is filled with an elastomer.

* * * * *